(12) United States Patent
Kobayashi et al.

(10) Patent No.: US 6,846,376 B2
(45) Date of Patent: Jan. 25, 2005

(54) PROCESS FOR MANUFACTURING AN ELASTIC COMPOSITE SHEET

(75) Inventors: Toshio Kobayashi, Kagawa-ken (JP); Hideyuki Ishikawa, Kagawa-ken (JP); Satoshi Mitsuno, Kagawa-ken (JP)

(73) Assignee: Uni-Charm Corporation, Ehime-ken (JP)

( * ) Notice: Subject to any disclaimer, the term of this patent is extended or adjusted under 35 U.S.C. 154(b) by 159 days.

(21) Appl. No.: 10/093,697

(22) Filed: Mar. 11, 2002

(65) Prior Publication Data

US 2002/0088534 A1 Jul. 11, 2002

Related U.S. Application Data

(62) Division of application No. 09/610,589, filed on Jul. 5, 2000, now Pat. No. 6,481,483.

(30) Foreign Application Priority Data

Jul. 6, 1999 (JP) ............................................. 11-192295

(51) Int. Cl.$^7$ ............................................... B29C 53/26
(52) U.S. Cl. ....................................... 156/201; 156/210
(58) Field of Search ................................. 156/164, 201, 156/210, 462, 474, 209, 461; 264/290.2; 425/369

(56) References Cited

U.S. PATENT DOCUMENTS 2,776,451 A  *  1/1957  Chavannes .................. 264/555
4,720,415 A  *  1/1988  Vander Wielen et al. ... 428/152
4,781,966 A  *  11/1988  Taylor ......................... 428/152
4,834,741 A  *  5/1989  Sabee ..................... 604/385.29
5,122,212 A  *  6/1992  Ferguson et al. ........... 156/209
5,167,897 A  *  12/1992  Weber et al. ............. 264/288.8
5,576,090 A  *  11/1996  Suzuki ....................... 428/152

FOREIGN PATENT DOCUMENTS

| DE | 196 04 953 | 8/1997 |
| JP | 1998-245757 | 9/1998 |
| WO | WO 97 02133 | 1/1997 |

* cited by examiner

*Primary Examiner*—Blaine Copenheaver
*Assistant Examiner*—Barbara J. Musser
(74) *Attorney, Agent, or Firm*—Lowe Hauptman Gilman & Berner, LLP

(57) ABSTRACT

An apparatus and process for making an elastic composite sheet including a pair of rolls adapted to bond respective surfaces of a inelastic sheet and a elastic sheet and fed together into a nip of the rolls. One of the rolls is formed with ridges while the other roll is formed with grooves and the ridges are engaged with the grooves with spaces left between surfaces of the ridges and the grooves to form the inelastic sheet on its surface with stripe-like crests and flat troughs each defined between each pair of the adjacent crests; and the inelastic sheet is bonded along its troughs to the surface of the elastic sheet.

12 Claims, 3 Drawing Sheets

PROCESS FOR MANUFACTURING AN ELASTIC COMPOSITE SHEET

This application is a Divisional of Application Ser. No. 09/610,589 filed Jul. 5, 2000 now U.S. Pat. No. 6,481,483.

BACKGROUND OF THE INVENTION

This invention relates to an apparatus and a process for making an elastic composite sheet.

Japanese Patent Application Disclosure No. 1998-245757 describes a process for making a sheet-like elastic composite comprising the steps of feeding a thermoplastic inelastic sheet into a nip between a heat-embossing roll formed on its peripheral surface with stripe-like ridges and grooves and a roll formed on its peripheral surface with the similar ridges and grooves adapted to be engaged with those of the heat-embossing roll to form the inelastic sheet with the corresponding ridges and grooves, and feeding a elastic sheet together with the inelastic sheet formed with the ridges and grooves into a nip between the embossing roll and a flat roll to heat-seal the inelastic sheet only along the ridges formed thereon with the elastic sheet.

The process described in the Japanese Patent Application Disclosure No. 1998-245757 requires two separate the steps, i.e., the step of forming the inelastic sheet with the ridges and grooves and the step of heat-seal the inelastic sheet with the elastic sheet. On the step of forming the inelastic sheet with the ridges and grooves, heat transfer inevitably occurs from the embossing roll and the roll having the ridges and the grooves adapted to be engaged with those of the embossing roll to substantially the whole surface of the inelastic sheet. Such heat transfer hardens the inelastic sheet and thereby deteriorates a touch expected for this inelastic sheet.

SUMMARY OF THE INVENTION

It is an object of this invention to provide an apparatus for making an elastic composite sheet enabling the elastic composite sheet to be made through the number of the steps fewer than the prior art has required without deterioration of a touch expected to be presented by the sheet.

According to one aspect of this invention, there is provided an apparatus for making an elastic composite sheet comprising a pair of rolls opposed to each other adapted to bond respective surfaces of a inelastic sheet and a elastic sheet placed one upon another and fed together into a nip of the pair of rolls to each other, wherein:

one of the rolls is formed on a peripheral surface thereof with a plurality of ridges projecting outward radially of the roll and extending circumferentially at predetermined intervals while the other of the rolls is formed on a peripheral surface thereof with a plurality of grooves recessed inward radially of the roll and extending also circumferentially at predetermined intervals; the ridges are engaged with the grooves with spaces left between surfaces of the ridges and the grooves to form the inelastic sheet on a surface thereof with a plurality of stripe-like crests extending in one direction and a plurality of flat troughs each defined between each pair of the adjacent crests; and the inelastic sheet is bonded along the troughs to the surface of the elastic sheet.

According to another aspect of this invention, there is provided a process for making an elastic composite sheet comprising a step of feeding a inelastic sheet and a elastic sheet placed one upon another together into a nip of a pair of rolls opposed to each other and thereby bonding respective surfaces of the inelastic sheet and the elastic sheet to each other, wherein:

one of the rolls is formed on a peripheral surface thereof with a plurality of ridges projecting outward radially of the roll and extending circumferentially at predetermined intervals while the other of the rolls is formed on a peripheral surface thereof with a plurality of grooves recessed inward radially of the roll and extending also circumferentially at predetermined intervals and the process comprises the steps of engaging the ridges with the grooves with spaces left between surfaces of the ridges and the grooves to form the inelastic sheet on a surface thereof with a plurality of stripe-like crests extending in one direction and a plurality of flat troughs each defined between each pair of the adjacent crests; and bonding the inelastic sheet along the troughs to the surface of the elastic sheet.

The apparatus and process for making the elastic composite sheet as has been described hereinabove is advantageous in that the inelastic sheet can be formed on its surface with a plurality of stripe-like crests extending in one direction and a plurality of troughs each defined between each pair of the adjacent crests extending also in the one direction and simultaneously the troughs of the inelastic sheet can be bonded to the surface of the elastic sheet merely by feeding the inelastic sheet together with the elastic sheet into the nip between a pair of rolls. In this way, the elastic composite sheet can be made through the minimum number of the steps. The ridges and the grooves formed on the respective rolls are engaged one with another in non-contact fashion and therefore it is not apprehended that heat might be transferred to the crests of the inelastic sheet and deteriorate a touch presented by these crests of the inelastic sheet.

DETAILED DESCRIPTION OF THE PREFERRED EMBODIMENTS

Details of an apparatus according to this invention for making an elastic composite sheet will be more fully understood from the description given hereunder with reference to the accompanying drawings.

Figure 1:
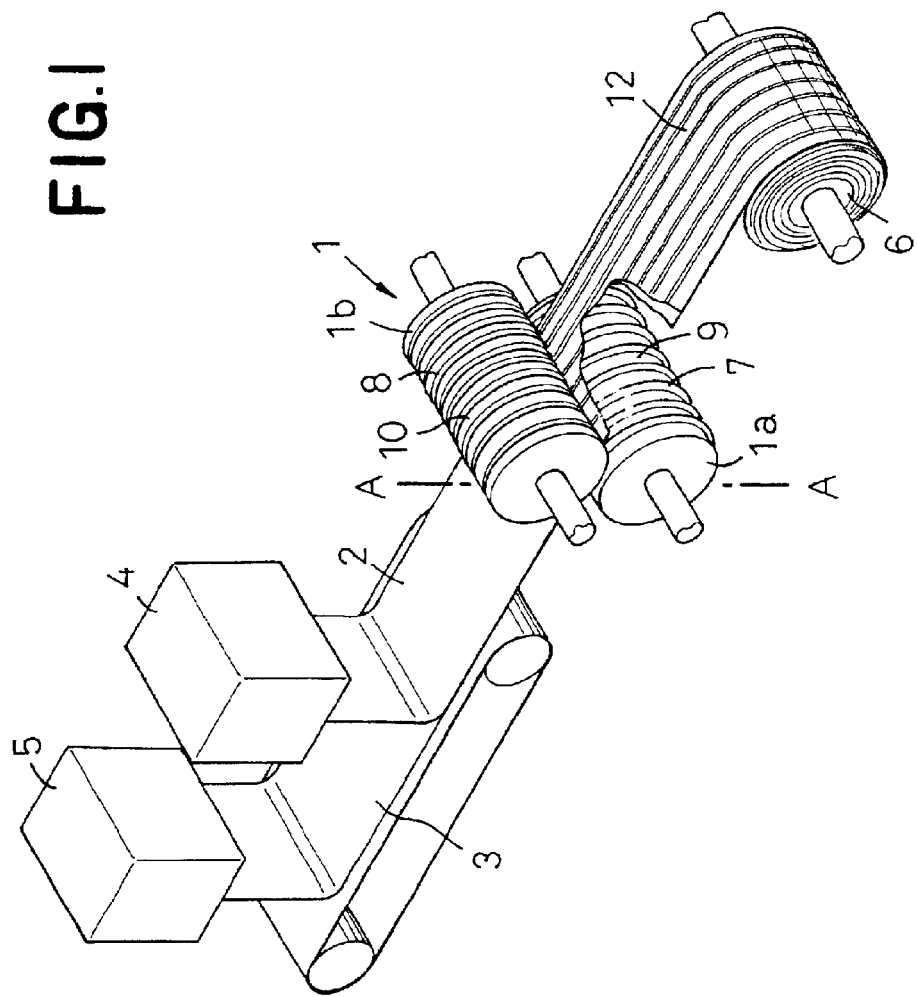
FIG. 1 is a perspective view of an apparatus according to this invention for making an elastic composite sheet.
Figure 2:
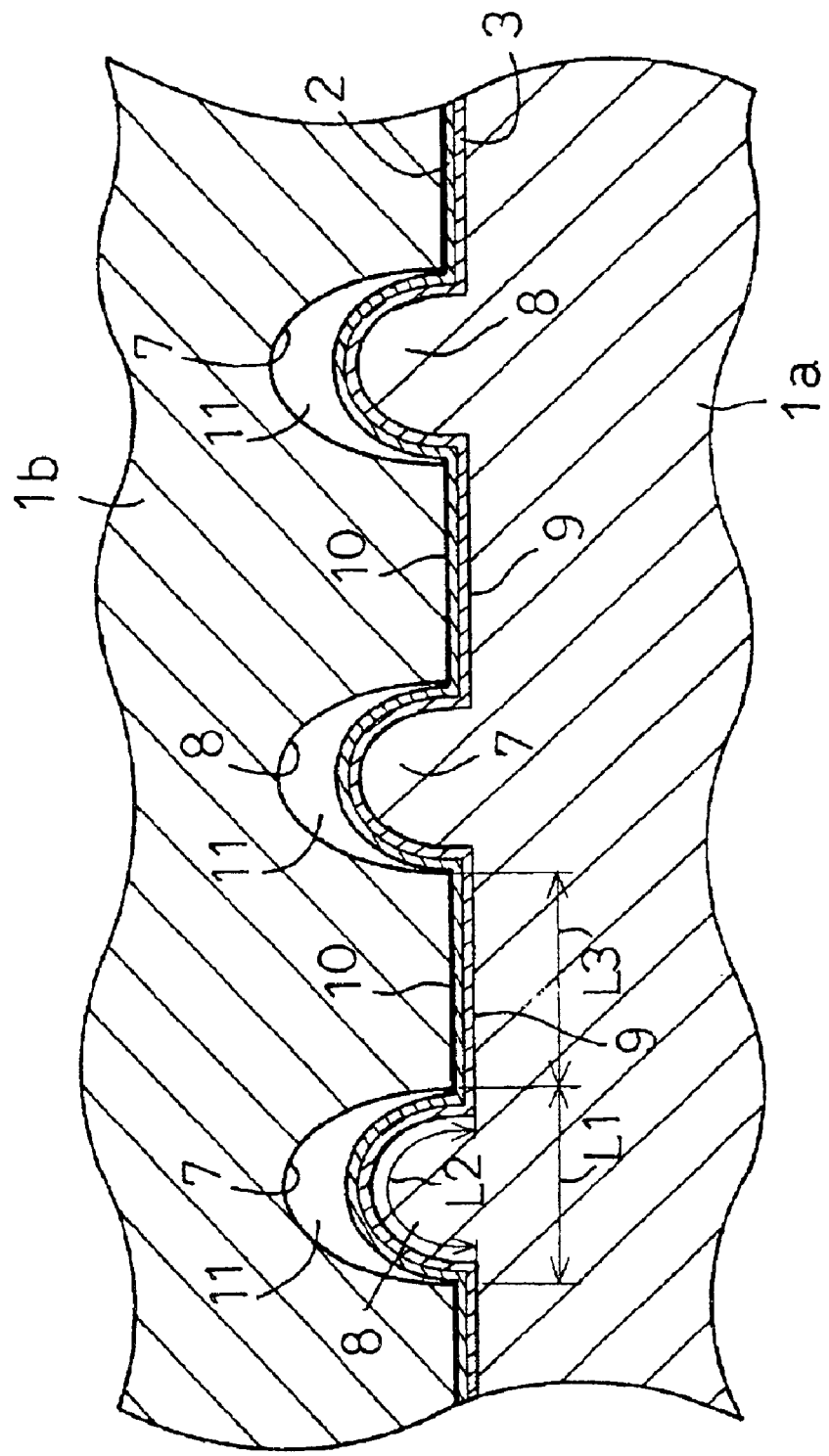
FIG. 2 is a sectional view taken along line A—A in FIG. 1.

FIG. 1 is a perspective view of an apparatus 1 for making an elastic composite sheet and FIG. 2 is a sectional view taken along line A—A to show an important part of the apparatus. Referring to FIG. 1, upstream of the apparatus 1, there are provided feeders 4, 5 of a inelastic sheet 2 and a elastic sheet 3, respectively. Downstream of the apparatus 1, there is provided a take-up roller 6 for a finished composite sheet 12. The apparatus 1 comprises a pair of rolls 1a, 1b vertically opposed to each other.

The lower roll 1a is formed on its peripheral surface with a plurality of ridges 7 projecting outward radially of the roll 1a. The upper roll 1b is formed on its peripheral surface with a plurality of grooves 8 recessed inward radially of the roll 1b and adapted to be engaged with the ridges 7 on the lower roll 1a. The ridges 7 and the grooves 8 extend circumferentially around an axis of the rolls 1a, 1b. With the apparatus 1 of this invention, spaces 11 are left between surfaces of the ridges 7 and grooves 8 when the ridges 7 on the roll 1a are engaged with the grooves 8 on the roller 1b, as will be apparent from FIG. 2. At least one of these rolls 1a, 1b is heated to seal the two sheets 2, 3 with each other. It is also possible to arrange the ridges 7 and the grooves 8 to extend axially of these rolls 1a, 1b.

The inelastic sheet 2 and the elastic sheet 3 are fed from the respective feeders 4, 5 so that the inelastic sheet 2 may overlie the elastic sheet 3. These sheets 2, 3 are laminated with each other in the course defined between the feeders 4, 5 and the apparatus 1 and then enter a nip between the pair of rolls 1a, 1b. In this contact zone defined between the ridges 7 and the grooves 8 on the rolls 1a, 1b, respectively, the inelastic sheet 2 lies adjacent the grooves 8 and the elastic sheet 3 lies adjacent the ridges 7. These sheets 2, 3 are stretched by the ridges 7. The ridges 7 and the groove 8 are not in surface-contact relationship and therefore the inelastic sheet 2 is not heat-sealed with the elastic sheet 3. The inelastic sheet 2 and the elastic sheet 3 are heat-sealed with each other on flat surfaces 9, 10 of the respective rolls 1a, 1b defined between each pair of adjacent ridges 7 and defined between each pair of adjacent grooves 8, respectively.

Having left the apparatus 1, regions of the elastic sheet 3 having been stretched by engagement between the ridges 7 and the grooves 8 substantially restore their initial flatness under an elasticity of the sheet 3 while the inelastic sheet 2 is formed thereon with a plurality of stripe-like crests 2a extending in one direction. The inelastic sheet 2 is formed by the flat surfaces 9, 10 of the respective rolls 1a, 1b between each pair of the adjacent crests 2a with a practically flat trough 2b. These flat troughs 2b of the inelastic sheet 2 is heat-sealed with the elastic sheet 3.

In the apparatus 1, a value corresponding to an arc dimension L2 of the ridge 7 divided by a chord of the ridge connecting opposite ends of the arc should be in a range of 1.5~4.5. At the value less than 1.5, the arc dimension of the crest 2a formed on the surface of the inelastic sheet 2 would be insufficient to obtain a desired stretch ratio of the composite sheet 12. At the value higher than 4.5, depending on the maximum stretch ratio of the elastic sheet 3, the crest 2a of the inelastic sheet 2 would slacken even after the maximum stretch ratio has been exceeded. Consequently, a touch presented by the inelastic sheet 2 would be deteriorated.

In the apparatus 1, a value corresponding to the chord dimension L1 of the ridge 7 divided by a dimension L3 between a pair of the adjacent ridges 7, more specifically, between one end of the one ridge 7 and one end of the adjacent ridge 7 opposed to each other should be in a range of 0.1~0.5. At the value less than 0.1, the dimension of the respective flat surfaces 9, 10 formed on the rolls 1a, 1b, respectively, would be insufficient to achieve a reliable sealing between the inelastic sheet 2 and the elastic sheet 3. At the value higher than 0.5, the number of relatively rigid seal lines would increase on the inelastic sheet 2 as well as on the elastic sheet 3, resulting in a deteriorated touch of the composite sheet 12.

A stretch ratio of the composite sheet 12 made by the apparatus 1 can be calculated according to the following equation:

Stretch ratio=$\{(L2+L3/L1+L3)-1\}\times 100$ where

L1=chord dimension of ridge 7

L2=arc dimension of ridge 7

L3=dimension between adjacent ridges 7, 7.

The stretch ratio of the composite sheet 12 should be in a range of 33~318%.

Figure 3:
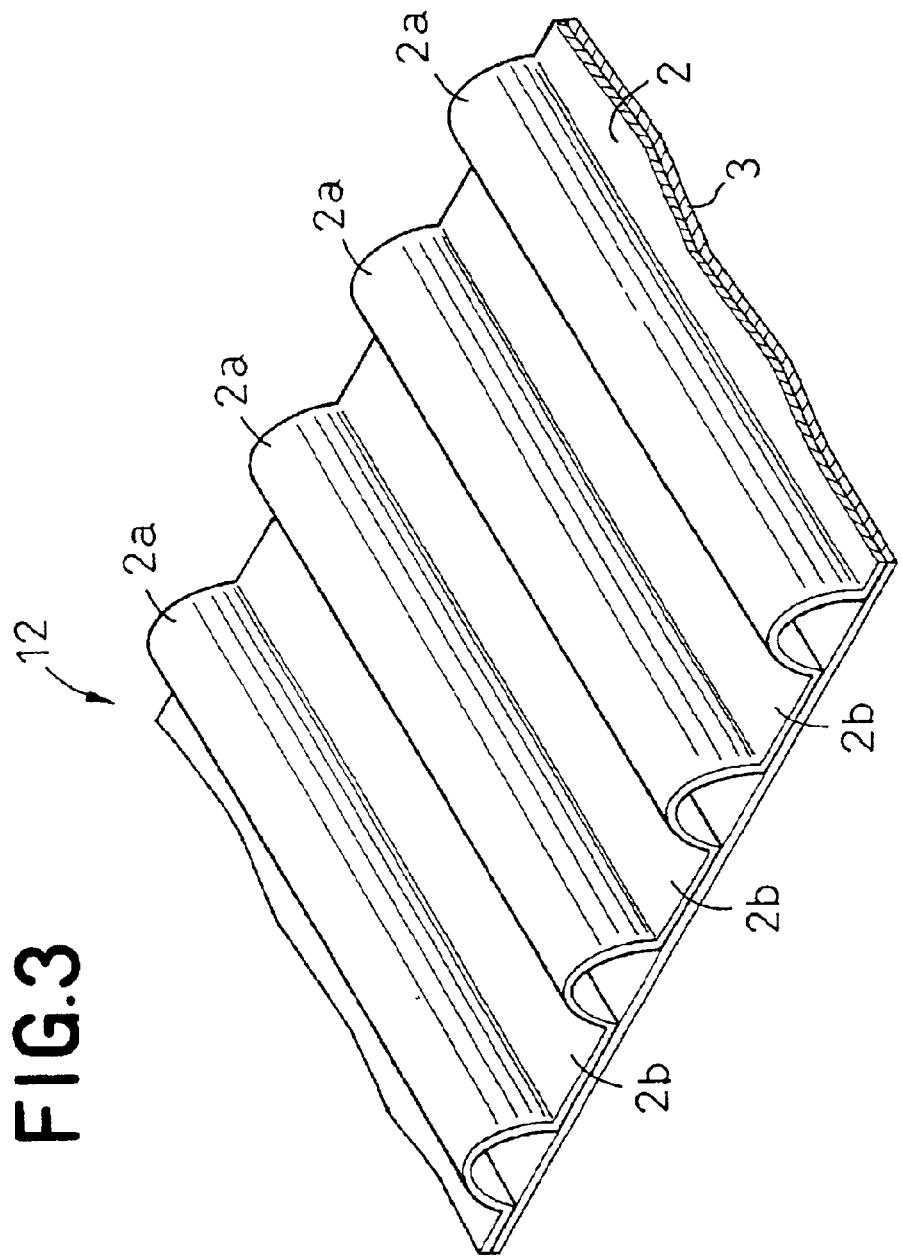
FIG. 3 is a perspective view of the elastic composite sheet obtained by the apparatus and a process according to this invention.

FIG. 3 is a perspective view of the elastic composite sheet 12 made by the apparatus 1. The composite sheet 12 comprises the inelastic sheet 2 and the elastic sheet 3 laminated with each other wherein the inelastic sheet 2 is formed thereon with a plurality of the crests 2a extending in one direction and a plurality of the practically flat troughs 2b defined between each pair of the adjacent crests 2a and extending also in the one direction. The inelastic sheet 2 is sealed at the troughs 2b with the surface of the elastic sheet 2 and the crests 2a of the inelastic sheet 2 are not sealed with the surface of the elastic sheet 2. The inelastic sheet 2 as well as the elastic sheet 3 can be stretched by the arc dimensions of the crests 2a as the composite sheet 12 is stretched transversely of the direction in which the crests 2a formed on the inelastic sheet 2 extend.

The inelastic sheet 2 may be formed by a nonwoven fabric of thermoplastic synthetic resin fiber. The nonwoven fabric may be selected from those of various types such as spun lace-, needle punch-, melt blown-, thermal bond-, spun bond- or chemical bond-type. The inelastic sheet has a basis weight preferably of 15~80 g/m$^2$, more preferably of 20~60 g/m$^2$. Component fiber for the nonwoven fabric may be selected from various types of thermoplastic fiber such as polyolefine, polyester and polyamide fibers, and conjugated fiber such as polyethylene/polypropyrene or polyester conjugated fiber.

The elastic sheet 3 may be formed by elastomer of thermoplastic synthetic resin. The elastomer may be selected from a group including polyolefine, polyester, polyamide and polyurethane elastomers.

Bonding between the inelastic sheet 2 and the elastic sheet may be carried out using the heat-sealing or suitable adhesive such as hot melt adhesive. For the case in which the adhesive is used, the inelastic sheet 2 and the elastic sheet 3 are fed to the apparatus 1 after the opposed surfaces of these two sheets 2, 3 have been bonded to each other. Traveling through the apparatus 1 between the ridges 7 and the grooves 8 thereof, the inelastic sheet 2 is forcibly stretched by the ridges 7 and broken. Contraction of the elastic sheet 3 causes the inelastic sheet 2 also to be contracted and thereupon the composite sheet 12 is formed with gathers.

What is claimed is:

1. A process of making an elastic composite sheet, said process comprising the steps of:

feeding an inelastic web and an elastic web placed one upon another together into a nip of first and second rolls opposed to each other, wherein:

the first roll has on a peripheral surface thereof a plurality of ridges each projecting outward radially and extending circumferentially of said first roll, said ridges being arranged at predetermined intervals in an axial direction of said first roll, and the second roll has on a peripheral surface thereof a plurality of grooves each being recessed inward radially and extending circumferentially of said second roll, said grooves being arranged at predetermined intervals in an axial direction of said second roll;

engaging said ridges with said grooves with spaces left between surfaces of said ridges and said grooves to form on a surface of said inelastic web a plurality of crests extending in one direction and a plurality of flat troughs each being located between one pair of the adjacent crests; and bonding said inelastic web along said troughs to said elastic web;

wherein said elastic web is fed directly into said nip without being pre-stretched; and in said engaging step, an inner surface of each of the grooves in the nip is physically spaced from both said webs.

2. A process of making an elastic composite sheet, said process comprising the steps of:
feeding an inelastic web and an elastic web placed one upon another together into a nip of first and second rolls opposed to each other, wherein:
the first roll has on a peripheral surface thereof a plurality of ridges each projecting outward radially and extending circumferentially of said first roll, said ridges being arranged at predetermined intervals in an axial direction of said first roll, and
the second roll has on a peripheral surface thereof a plurality of grooves each being recessed inward radially and extending circumferentially of said second roll, said grooves being arranged at predetermined intervals in an axial direction of said second roll;
engaging said ridges with said grooves with spaces left between surfaces of said ridges and said grooves to form on a surface of said inelastic web a plurality of crests extending in one direction and a plurality of flat troughs each being located between one pair of the adjacent crests; and
bonding said inelastic web alone said troughs to said elastic web;
wherein
said elastic web is fed directly into said nip without being pre-stretched; and
in said engaging step, a bottom of each of the grooves in the nip is physically spaced from both said webs.

3. A process of manufacturing an elastic composite sheet, said process comprising the steps of:
providing an elastic web;
providing an inelastic web;
bonding said elastic web to said inelastic web;
feeding the bonded webs into a nip between first and second rolls, the first roll having at least one ridge and the second roll having at least one matching groove;
stretching the bonded webs in the nip by at least said ridge to form in said inelastic web a permanently deformed portion; and
relaxing the webs to allow the elastic web to contract, thereby providing the elastic composite sheet in which the webs are spaced from each other in the permanently deformed portion of said inelastic web;
wherein, in the nip, an inner surface of the groove is physically spaced from both said webs.

4. A process of manufacturing an elastic composite sheet, said process comprising the steps of:
providing an elastic web;
providing an inelastic web;
bonding said elastic web to said inelastic web;
feeding the bonded webs into a nip between first and second rolls, the first roll having at least one ridge and the second roll having at least one matching groove;
stretching the bonded webs in the nip by at least said ridge to form in said inelastic web a permanently deformed portion; and
relaxing the webs to allow the elastic web to contract, thereby providing the elastic composite sheet in which the webs are spaced from each other in the permanently deformed portion of said inelastic web;
wherein, in the nip, a bottom of the groove is physically spaced from both said webs.

5. A process of manufacturing an elastic composite sheet, said process comprising the steps of:
dispensing a first web on a moving belt;
dispensing a second web on the first web carried by said moving belt, the second web overlaying the first web, one of said webs being an elastic web while the other web being an inelastic web;
feeding the webs directly from the moving belt into a nip between first and second rotating rolls, the first roll having at least one ridge and the second roll having at least one matching groove;
in said nip, simultaneously stretching the webs by at least said ridge to form in said inelastic web a permanently deformed portion and heat bonding the webs together in regions outside said permanently deformed portion;
relaxing the webs to allow the elastic web to contract, thereby providing the elastic composite sheet in which the webs are spaced from each other in the permanently deformed portion of said inelastic web.

6. The process of claim 5, wherein, in said nip, an inner surface of the groove is physically spaced from both said webs.

7. The process of claim 5, wherein, in said nip, a bottom of the groove is physically spaced from both said webs.

8. The process of claim 5, wherein, in said nip, the elastic web is in direct physical contact with the ridge.

9. The process of claim 8, wherein the first web is elastic.

10. The process of claim 5, wherein said webs are generally flat immediately prior to entering said nip.

11. The process of claim 5, further comprising the steps of
providing the first roll with a plurality of ridges each projecting outward radially and extending circumferentially of said first roll, said ridges being arranged at predetermined intervals in an axial direction of said first roll; and
providing the second roll with a plurality of grooves each being recessed inward radially and extending circumferentially of said second roll, said grooves being arranged at the predetermined intervals in an axial direction of said second roll.

12. The process of claim 5, further comprising the steps of
providing the first roll with a plurality of ridges each projecting outward radially and extending axially of said first roll; and
providing the second roll with a plurality of grooves each being recessed inward radially and extending axially of said second roll.

* * * * *